United States Patent
Sellberg et al.

(10) Patent No.: US 8,027,901 B2
(45) Date of Patent: Sep. 27, 2011

(54) AUTOMATIC GENERATION OF AN ORDER IN AN INSTRUMENT IN A SPECIFIED CURRENCY

(75) Inventors: Lars-Ivar Sellberg, Danderyd (SE); Claes Urban Dackberg, Stockholm (SE); Christer Wennerberg, Stockholm (SE)

(73) Assignee: OMX Technology AB, Stockholm (SE)

( * ) Notice: Subject to any disclaimer, the term of this patent is extended or adjusted under 35 U.S.C. 154(b) by 2440 days.

(21) Appl. No.: 10/444,091

(22) Filed: May 23, 2003

(65) Prior Publication Data

US 2004/0236664 A1    Nov. 25, 2004

(51) Int. Cl.
    *G06Q 40/00* (2006.01)
(52) U.S. Cl. ......................................... 705/37
(58) Field of Classification Search ............... 705/35, 705/37, 27
    See application file for complete search history.

(56) References Cited

U.S. PATENT DOCUMENTS

| | | | | |
|---|---|---|---|---|
| 5,077,665 A * | 12/1991 | Silverman et al. | | 705/37 |
| 5,101,353 A * | 3/1992 | Lupien et al. | | 705/37 |
| 5,136,501 A * | 8/1992 | Silverman et al. | | 705/37 |
| 5,963,923 A * | 10/1999 | Garber | | 705/37 |
| 6,205,433 B1 * | 3/2001 | Boesch et al. | | 705/26 |
| 6,278,982 B1 * | 8/2001 | Korhammer et al. | | 705/36 R |
| 6,304,858 B1 * | 10/2001 | Mosler et al. | | 705/37 |
| 6,721,715 B2 * | 4/2004 | Nemzow | | 705/26 |
| 7,047,218 B1 * | 5/2006 | Wallman | | 705/35 |
| 7,231,363 B1 * | 6/2007 | Hughes et al. | | 705/37 |
| 7,249,085 B1 * | 7/2007 | Kinney et al. | | 705/37 |
| 2001/0011241 A1 * | 8/2001 | Nemzow | | 705/35 |
| 2002/0016762 A1 * | 2/2002 | Feilbogen et al. | | 705/39 |
| 2002/0107781 A1 * | 8/2002 | Neyman et al. | | 705/37 |
| 2002/0161692 A1 * | 10/2002 | Loh et al. | | 705/37 |
| 2002/0184134 A1 * | 12/2002 | Olsen et al. | | 705/37 |
| 2004/0019554 A1 * | 1/2004 | Merold et al. | | 705/37 |

OTHER PUBLICATIONS

Johnson, Norman Anthony et al. Online auctions for business-to-business transactions. The National Public Accountant. Washington: Jun. 2002. p. 6, 3 pgs.*

Businessline. Auctioning methods: Risk-adverse bidders and 'winner's curse'. Chennai: Dac 11,1999. p. 1.*

* cited by examiner

*Primary Examiner* — James Kramer
*Assistant Examiner* — Eric T Wong
(74) *Attorney, Agent, or Firm* — Nixon & Vanderhye P.C.

(57) ABSTRACT

In an automated trading system wherein orders in an instrument in a specified currency are received and a trade in the instrument is performed when, for a certain volume of the instrument, a bid price matches an ask price, a method is provided for automatically generating an order in the instrument in said specified currency. The method comprised the steps of receiving from e.g. a currency market or a market maker a current exchange rate between a currency other than said specified currency and the specified currency; receiving from a trader an order in the instrument in said other currency; calculating a price of the order in the specified currency based on the received order and the current exchange rate; and generating the order in the instrument in the specified currency.

26 Claims, 4 Drawing Sheets

| Instrument A | | | |
|---|---|---|---|
| Bid (EUR) | Depth | Ask (EUR) | Depth |
| 110 | 2000 | 111 | 2400 |
| 109 | 4000 | 112 | 6000 |
| 108 | 8000 | 113 | 12000 |

Fig. 2a

| Instrument A | | | |
|---|---|---|---|
| Bid (EUR) | Depth | Ask (EUR) | Depth |
| 110 | 2600 | 111 | 2400 |
| 109 | 4000 | 112 | 6000 |
| 108 | 8000 | 113 | 12000 |

Fig. 2b

| Instrument A | | | |
|---|---|---|---|
| Bid (EUR) | Depth | Ask (EUR) | Depth |
| 110 | 2000 | 111 | 2400 |
| 109 | 4600 | 112 | 6000 |
| 108 | 8000 | 113 | 12000 |

Fig. 2c

| Instrument A | | | |
|---|---|---|---|
| Bid (EUR) | Depth | Ask (EUR) | Depth |
| 110 | 2000 | 111 | 1800 |
| 109 | 4000 | 112 | 6000 |
| 108 | 8000 | 113 | 12000 |

Fig. 2d

| Instrument A | | | |
|---|---|---|---|
| Bid (EUR) | Depth | Ask (EUR) | Depth |
| 110 | 2000 | 111 | 2400 |
| 109 | 4000 | 112 | 6000 |
| 108 | 8000 | 113 | 12000 |

| Currency EURO | | | |
|---|---|---|---|
| Bid (USD) | Depth | Ask (USD) | Depth |
| 1.066 | 200000 | 1.076 | 240000 |
| 1.064 | 400000 | 1.078 | 600000 |
| 1.062 | 800000 | 1.080 | 1200000 |

Fig. 4a

| Instrument A | | | |
|---|---|---|---|
| Bid (EUR) | Depth | Ask (EUR) | Depth |
| <u>110.5</u> | <u>600</u> | 111 | 2400 |
| 110 | 2000 | 112 | 6000 |
| 109 | 4000 | 113 | 12000 |
| 108 | 8000 | | |

| Currency EURO | | | |
|---|---|---|---|
| Bid (USD) | Depth | Ask (USD) | Depth |
| <u>1.072</u> | <u>66600</u> | 1.076 | 240000 |
| 1.066 | 200000 | 1.078 | 600000 |
| 1.064 | 400000 | 1.080 | 1200000 |
| 1.062 | 800000 | | |

AUTOMATIC GENERATION OF AN ORDER IN AN INSTRUMENT IN A SPECIFIED CURRENCY

TECHNICAL FIELD OF THE INVENTION

The present invention relates generally to trading and more specifically to methods for automatically generating an order in an instrument in a specified currency, to computer program products for performing the methods, and to automated trading systems having the methods implemented.

DESCRIPTION OF RELATED ART AND BACKGROUND OF THE INVENTION

When trading shares and other financial instruments in an automated trading system, both buyers and sellers want to be capable of buying and selling instantly and to get the best possible price. Thus, a very liquid market is desirable since such a market provides for instantaneous trading, low spread, and a price, which reflects the market at each instant.

Sometimes a trader may want to sell or buy a specified volume of a particular financial instrument in another currency than the one used for that instrument in the automated trading system. Typically, the trader has then to give a price in the currency used for that instrument, and then, provided that the order is met on the market, his broker sells or buys the currency used for that instrument depending on whether a sale or a purchase has been made.

Usually, the trader does not have knowledge in advance of the exchange rate for such currency transaction, nor may the trader give conditional orders depending on the exchange rate obtainable. Further, it is believed that the trader does not obtain a price of the exchange rate, which always is the best possible price at the exact moment of the sale or purchase. Typically, the currency transaction and the sale or purchase are performed at different times, and a minor trader may often only obtain a current exchange rate on a day-to-day basis.

SUMMARY OF THE INVENTION

A solution to the problems identified above would be to modify the automated trading system to be capable of receiving orders in each instrument in a plurality of currencies and to form an order book for each one of the instruments in each one of the plurality of currencies.

The inventors of the present invention have noted that such a modified automated trading system, even in the case that only two different currencies are supported, leads to a very illiquid market in all but one of the currencies supported.

In one aspect, a method in an automated trading system is provided, which overcomes the problems associated with the prior art and which allows a trader to give an order in an instrument in a currency that is different from the currency normally used for orders in that instrument, and which order is matched with orders received in the currency normally used.

In another aspect, a method is provided, which increases the liquidity on the market.

In a further aspect, a method is provided, which makes use of one order book only for each instrument traded.

In yet a further aspect, a method is provided, which is easy to implement in existing trading systems.

In still a further aspect a software product loadable into the internal memory of a computer is provided for performing the above-identified method when the software product is run on the computer.

In yet a further aspect, an automated trading system is provided for receiving orders in an instrument in a specified currency, and for performing a trade in that instrument when, for a certain volume of the instrument, a bid price matches an ask price, which solves the problems associated with the prior art.

An advantage of one or more embodiments is that the number and sizes of the orders in an instrument, which can be given in a plurality of currencies, will increase. The overall trading will increase to the benefits of the sellers and buyers. Only one order book for each instrument is necessary, and thus no fragmentation of liquidity is performed.

Further principles of the invention, and advantages thereof, will be evident from the following detailed description of preferred embodiments of the present invention given hereinafter and the accompanying FIGS. 1-6, which are given by way of illustration only, and shall thus not limit the scope of the present invention.

BRIEF DESCRIPTION OF THE DRAWINGS

FIGS. 4*a-h* are schematic highly simplified extracts of order books of a trading system for an instrument and for a currency, respectively, related to the method as illustrated in FIG. 3.

DETAILED DESCRIPTION OF PREFERRED EMBODIMENTS

Figure 1:
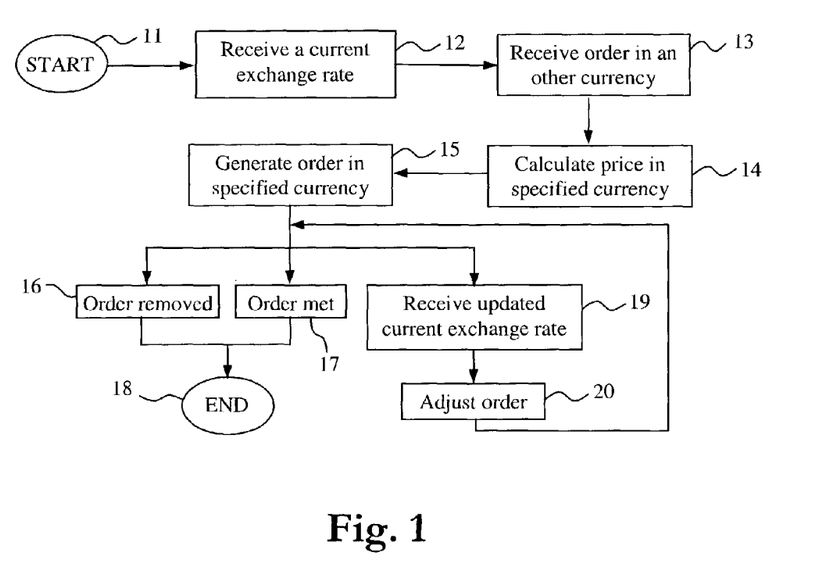
FIG. 1 is a schematic flow scheme of a method according to an embodiment of the present disclosure.

With reference to FIG. 1, which is a schematic flow scheme of an algorithm for method for automatically generating an order in an instrument in a specified currency, an embodiment will be described. The illustrated algorithm can be implemented in an automated trading system wherein bids and offers in instruments in specified currencies are received and entered into an order book, and a trade in one of the instruments is performed when, for a certain volume of that instrument, a bid price matches an ask price.

In act 11, the algorithm is started, and in act 12, a current exchange rate between a currency, which is different from a specified currency for a particular instrument, is received. The specified currency is the currency in which the instrument is traded. In act 13, an order is received in the particular instrument in a currency different from the specified currency from a trader.

Typically, an updated exchange rate between the different currency and the specified currency is received repeatedly and automatically from the currency market or the market maker, and the last received updated exchange rate between the different currency and the specified currency at the time of receiving the order is used as the received current exchange rate. The frequency, at which the updated exchange rate between the different currency and the specified currency is received, may be from several times a second down to once an hour, or even more infrequently.

If the updated exchange rate between the different currency and the specified currency is received repeatedly and automatically from a market maker, this market maker guarantees to perform a currency transaction based on the last received updated exchange rate. Thus, the updated exchange rate as received may be viewed upon as a real time feed of guaranteed exchange rates. Upper limits of the size of the guaranteed currency transaction may exist.

Next, in act 14, a price of the order in the specified currency is calculated based on the received order and the current exchange rate, and, in act 15, the order in the instrument is generated in the specified currency and put on the market, i.e. entered into the order book for that instrument.

Three different possible actions may then be performed. The order may, in act 16, be removed from the order book, e.g. in response to a request made by the trader. Alternatively, the order is, in act 17, met by another order on the market, whereupon a trade in the instrument and a currency transaction are performed concurrently. After the order has been removed or been met the inventive algorithm is, in act 18, ended.

A third possibility is that, in act 19, an updated exchange rate between the different currency and the specified currency is received while the order is in the order book. In such instance, the generated order is, in act 20, adjusted to reflect the updated exchange rate received, i.e. the earlier order is removed from the order book and the adjusted order is entered into the order book, after which the algorithm is returned back to a position immediately after step 15. The steps 19 and 20 comprise a loop for adjusting the generated order each time and updated exchange rate between the different currency and the specified currency is received.

The order received from the trader may be a bid and in such instance the exchange rate between the different currency and the specified currency is a buying price for buying the specified currency (with payment effectuated in the different currency). Correspondingly, if the order received from the trader is an offer, the exchange rate between the different currency and the specified currency is a selling price for selling the specified currency.

Note that one or more embodiments may provide for receiving orders in a selected group of currencies for each different instrument traded. An updated exchange rate is received for each combination of different currency and specified currency supported. One or more embodiments may provide for that orders in some or all of the instruments traded in the automated trading system can be receive in about currencies such as between 2 and 5.

The trader may continuously follow the updated exchange rates in order to also be capable to initiate an order depending on the current exchange rate, i.e. a favorable exchange rate may encourage the initiation of an order, whereas a less favorable exchange rate may restrain the initiation of the order.

Using one or more method embodiments including the acts of receiving the current exchange rate between the currency other than the specified currency and the specified currency, and generating an order in the specified currency based on an order received in the other currency, and the current exchange rate, a method is obtained, by which more orders, as compared to prior art methods, can be handled. As a result, a more liquid market with more conclusions of trades is obtained. The inventive algorithm is particularly useful when the instrument involved has a low turnover rate.

With reference now to FIGS. 2*a-d*, which are schematic highly simplified extracts of an order book for a single instrument A traded in euros, an example of the method as illustrated in FIG. 1 will be highlighted.

Figure 2A:
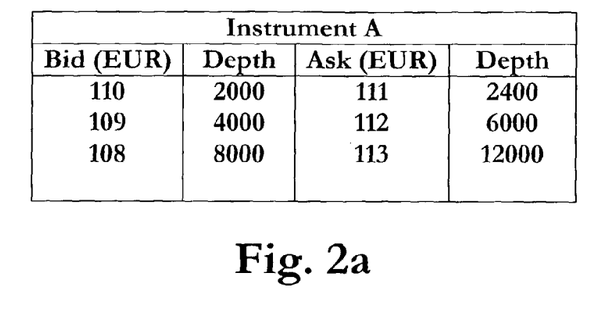
FIGS. 2*a-d* are schematic highly simplified extracts of an order book of a trading system for a single instrument related to the method as illustrated in FIG. 1.

FIG. 2*a* illustrates a typical situation during a trading day: a number of bids and offers exist. Each bid price and each ask price has an order depth given by the number and sizes of orders at that price.

Figure 2B:
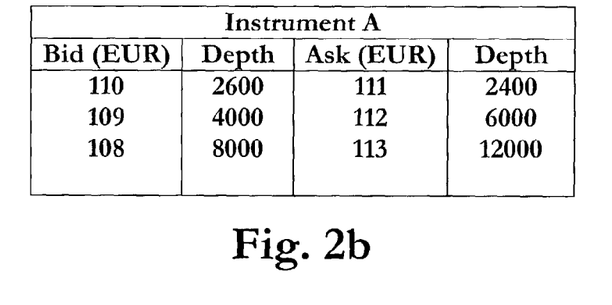

At this point a bid order is received from a trader: "buy 600 of instrument A for a maximum bid price of 119 US dollars". The method of FIG. 1 supports orders in US dollars (USD) for this instrument, and it is assumed that the last received exchange rate is 1.0 USD/EUR. The method calculates a price of the order in euros and generates the bid order in euros: "buy 600 of instrument A for a maximum bid price of 110 euros", and since no ask price of EUR110 is available, the order is entered into the order book. The result of this is shown in FIG. 2*b*: the order depth for a bid price of EUR110 has increased from 2000 to 2600.

Figure 2C:
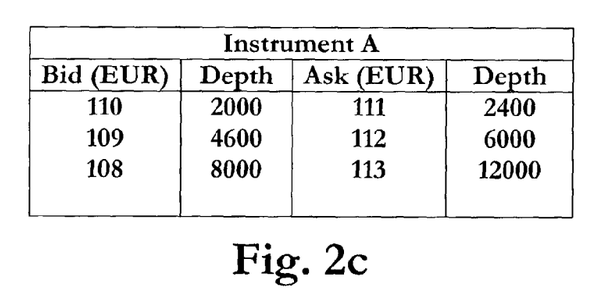

Assume now that an updated exchange rate of 1.09 USD/EUR is received. The bid order is now adjusted to "buy 600 of instrument A for a maximum bid price of 109 euros" to reflect the received updated exchange rate. The result of this adjustment is shown in FIG. 2*c*: the order depth for a bid price of EUR110 has decreased from 2600 to 2000, whereas the order depth for a bid price of EUR109 has increased from 4000 to 4600.

Figure 2D:
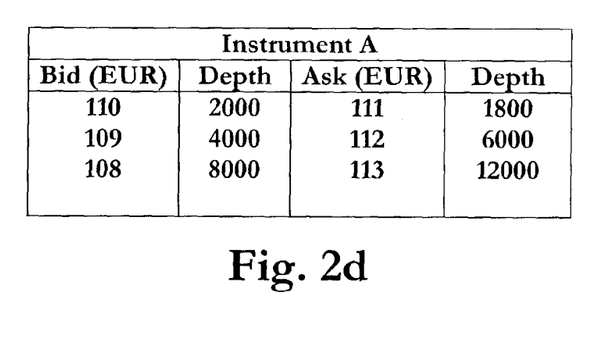

Assuming now that an updated exchange rate of 1.07 USD/EUR is received, the bid order is adjusted to "buy 600 of instrument A for a maximum bid price of 111 euros" to reflect the received updated exchange rate. This order is met by one or several offers as shown at the ask price of EUR111 in FIG. 2*c*. As a result a trade of 600 of instrument A at a price of EUR111 and a currency transaction of an amount corresponding to the size of the trade at an exchange rate of 1.07 USD/EUR are performed concurrently. In FIG. 2*d* is shown the resulting appearance of the order book: the order depth for a bid price of EUR109 has decreased from 4600 to 4000, and the order depth for an ask price of EUR111 has decreased from 2400 to 1800.

Figure 3:
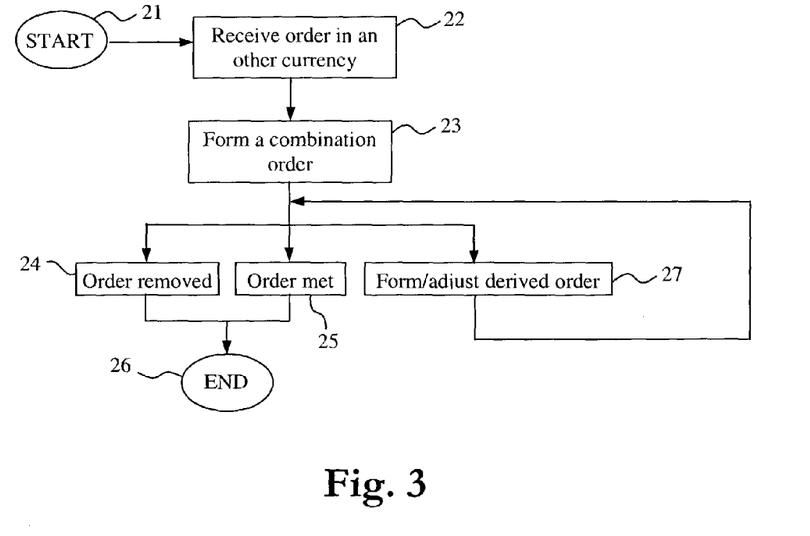
FIG. 3 is a schematic flow scheme of a method according to an embodiment of the present invention.

With reference next to FIG. 3, which is a schematic flow scheme of an algorithm for method for automatically generating an order in an instrument in a specified currency, embodiment will be described.

This embodiment is similar to the FIG. 1 embodiment, but differs in how the exchange rate is received. This embodiment can be implemented in an automated trading system wherein not only orders in an instrument in a specified currency are received but also orders in the specified currency are received and a trade in the specified currency is performed when, for a certain amount of the specified currency, a hid price matches an ask price. In other words the automated trading system includes an automated currency exchange market system.

The algorithm of FIG. 3 is, in act 21, started, and, in act 22, an order is received in a particular instrument in a currency, which is different from the specified currency in which that particular instrument is traded, from a trader.

Next, in act 23, a combination order comprising one order in the instrument in the specified currency and one order in the specified currency in the different currency are formed based on the received order in the instrument in the different currency.

Three different possible actions may then be performed depending on the circumstances. The order may, in act 24, be cancelled, e.g. in response to a request made by the trader. Alternatively, the combination order is, in act 25, met by other orders on the markets, whereupon a trade in the instrument and in the specified currency are performed simultaneously. After the order has been cancelled or been met the inventive algorithm is, in act 26, ended.

A third possibility, provided that the combination order is not immediately met by other orders, is to, in act 27, form a derived order in the instrument or in the specified currency, wherein the derived order is formed so that provided that the derived order will be met by another order, the other order of the combination order will automatically be met by still another order, and trades in the instrument and the specified currency can be performed simultaneously. The derived order, which may also be referred to as a bait, is entered into the order book for that instrument or currency, after which the algorithm is returned back to a position immediately after act 23.

When the market changes, the derived order may become obsolete, i.e. it does not fulfill the above-mentioned requirement. In such instance, the derived order has to be adjusted according to the subsisting market at each instant, i.e. the obsolete derived order is removed from the order book and the adjusted derived order is entered into the order book. This forms a portion of the act 27. The act 27 thus forms a loop for forming/adjusting the derived order, which at each instant is up to date with the market.

The derived order may be formed not only in the instrument or in the specified currency, but in both. This increases the possibility of having the combination order met.

This embodiment can take the sizes of the orders in the specified currency into account, and hence this solution calls for a more complex algorithm. For instance, when forming a derived order in the instrument or the specified currency, the best price provided in the other one of the instrument or the specified currency may not have sufficient order depth and in such instance the second best price, and optionally the third best price, may be considered.

Figure 4A:
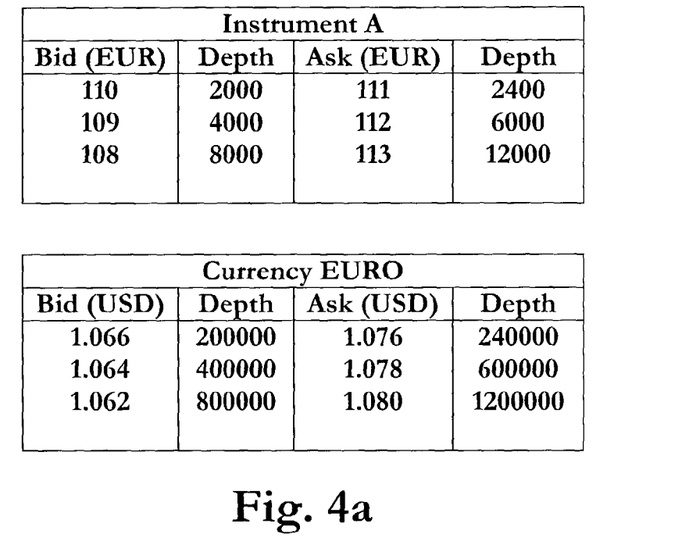
Figure 4B:
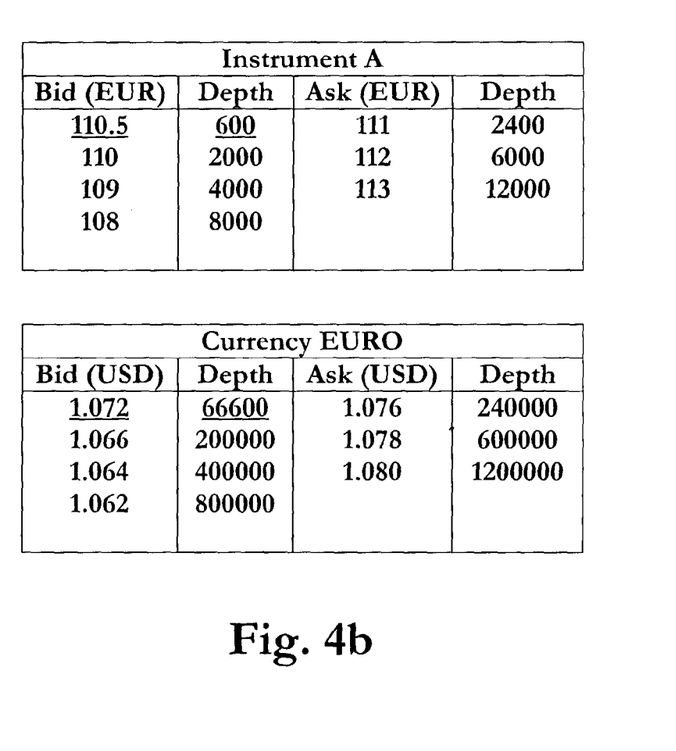

With reference next to FIGS. 4*a-b*, which are schematic highly simplified extracts of order books for a single instrument A traded in euros and for the currency euro as traded in US dollars, respectively, an example of the method as illustrated in FIG. 3 will be highlighted.

FIG. 4*a* illustrates a typical situation during a trading day: a number of bids and offers exist in each order book. Each bid price and each ask price has an order depth given by the number and sizes of orders at that price. The order depth for the instrument A is given in the volume of that instrument and the order depth for the currency euro are given in euros.

At this point a bid order is received from a trader: "buy 600 of instrument A for a maximum bid price of 119 US dollars". The method of FIG. 3 supports orders in US dollars for this instrument, and thus forms a combination order "buy 600 of instrument A and xx euros for the combined price of 119 US dollars, where xx euros are sufficient to buy the 600 of instrument A".

It is checked whether the best ask price for 600 of instrument A, i.e. EUR111, and the best ask price for 600×EUR111=EUR66600, i.e. 1.076 USD/EUR, match the combination order. In this case it does not match the combination order and as a consequence two derived orders are formed to increase the probability of having the combination order met in the near future.

A derived order for buying 600 of instrument A is formed from the best ask price for euros in a sufficient amount, i.e. 1.076 USD/EUR. USD119 divided by 1.076 USD/EUR gives EUR110.5. Thus a derived order is formed as an order for buying 600 of instrument A at EUR110.5. Provided that the derived order is met, the complete combination order is met. If the best ask price of 1.076 USD/EUR is increased, the bid price of the derived order has to be decreased correspondingly.

Similarly, a derived order for buying 66600 euros at a price of 1.072 USD/EUR (USD119/EUR111) is formed from the best ask price for instrument A in a sufficient amount, i.e. EUR111. Provided that the derived order is met, the complete combination order is met. As soon as one of the derived orders is met, the corresponding trades are performed and the other derived order is immediately cancelled.

In FIG. 4*b* these two derived orders are underlined for illustrative purposes, even if they appear to other traders as ordinary orders.

Figure 5:
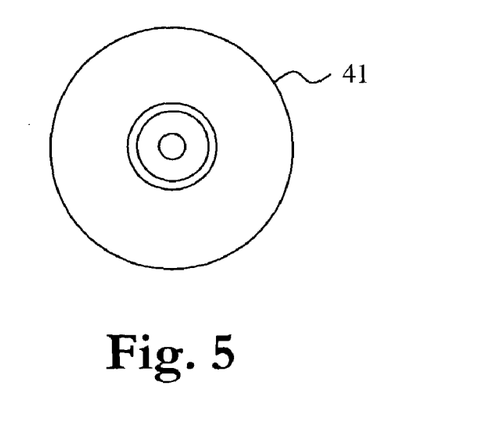
FIG. 5 illustrates a storage medium storing a computer program product for performing any of the methods of the present disclosure when run on a computer.
Figure 6:
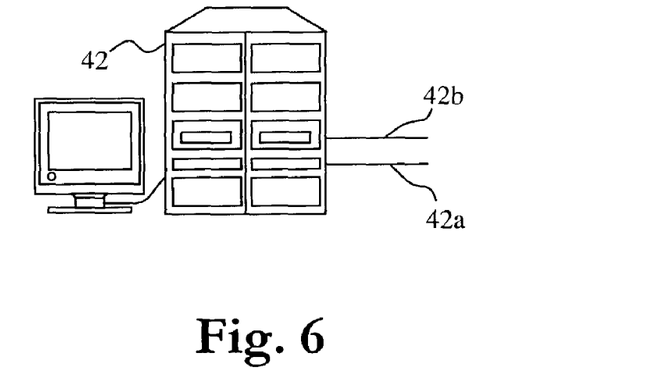
FIG. 6 illustrates a computer system, in which an automated trading system according to an embodiment is implemented.

Finally, FIG. 5 illustrates a storage medium 41, which stores a computer program product for performing any of the methods of the present invention, and FIG. 6 illustrates a computer system 42, in which an automated trading system according to the present invention is implemented.

Such automated trading system may comprise a module for receiving orders in an instrument in a specified currency via an input line 42*a*; a module for performing a trade in that instrument when, for a certain volume of the instrument, a bid price matches an ask price; a module for receiving an order in the instrument in another currency from a trader via line 42*a*; a module for repeatedly receiving an exchange rate between the other currency and the specified currency via an input line 42*b*; a module for calculating a price of the order in the specified currency based on the received order and the last received exchange rate; and a module for transferring the order in the instrument in the specified currency to the module for receiving orders in an instrument in a specified currency.

What is claimed is:

1. In an automated trading system wherein orders in an instrument in a specified currency are received and a trade in said instrument is performed when, for a certain volume of said instrument, an instrument bid price matches an instrument ask price, a method for automatically generating an order in said instrument priced in said specified currency, comprising:

said automated trading system repeatedly and automatically receiving, from an external source, an updated exchange rate between a currency other than said specified currency and said specified currency, wherein a last updated exchange rate received is a current exchange rate that is guaranteed at least until a next updated exchange rate is received;

said automated trading system receiving, from a trader, an order in said instrument priced in said other currency; and said automated trading system calculating a price of said order in said specified currency based on said received order and said current exchange rate; and said automated trading system generating said order in said instrument priced in said specified currency in an order book, wherein said order book includes a plurality of instrument bid orders priced in said specified currency, each with a different instrument bid price from at least one other instrument bid order of said plurality of instrument bid orders, wherein said order book includes a plurality of instrument ask orders priced in said specified currency, each with a different instrument ask price from at least one other instrument ask order of said plurality of instrument ask orders, and wherein the method further comprises said automated trading system performing a trade in said instrument between said generated order in said order book and another order in said order book and performing a currency transaction to convert between said other currency and said specified currency when said generated order is matched by said another order, wherein said trade and said currency transaction are performed concurrently.

2. The method of claim 1, further comprising:
said automated trading system adjusting, when said updated exchange rate between said other currency and said specified currency is received subsequent to generating said order in said instrument priced in said specified currency, said generated order to reflect said updated exchange rate received subsequent to said generating said order.

3. The method of claim 2, wherein said adjusting said generated order is performed each time said updated exchange rate between said other currency and said specified currency is received subsequent to said step of generating said order or subsequent to said step of adjusting said generated order to reflect said updated exchange rates received.

4. The method of claim 1, wherein said external source is a market maker, and said market maker guarantees to perform a currency transaction based on said current exchange rate.

5. The method of claim 1, wherein said external source is a currency market in which bids and offers in currencies are received, the method further comprising:
said automated trading system performing a currency trade in said currency market between said other currency and said specified currency when, for a certain amount of said other currency, a currency bid price matches a currency ask price, wherein said received updated exchange rate is determined based on bids or offers in said specified currency.

6. The method of claim 1, wherein
said order received from said trader is an instrument bid order priced in said other currency, and
said current exchange rate between said other currency and said specified currency reflects a buying price for buying said specified currency.

7. The method of claim 1, wherein
said order received from said trader is an instrument ask order priced in said other currency, and
said current exchange rate between said other currency and said specified currency reflects a selling price for selling said specified currency.

8. The method of claim 1, wherein said other currency is selected from a group of available currencies.

9. A non-transitory computer readable medium having a program recorded therein, said program comprising software code portions for a computer of an automated trading system wherein orders in an instrument in a specified currency are received and a trade in said instrument is performed when, for a certain volume of said instrument, an instrument bid price matches an instrument ask price, said software code portion causing the computer to perform a method for automatically generating an order in said instrument priced in said specified currency, the method comprising:
repeatedly and automatically receiving, from an external source, an updated exchange rate between a currency other than said specified currency and said specified currency, wherein a last updated exchange rate received is a current exchange rate that is guaranteed at least until a next dated exchange rate is received;
receiving, from a trader, an order in said instrument priced in said other currency; and
calculating a price of said order in said specified currency based on said received order and said current exchange rate; and
generating said order in said instrument priced in said specified currency in an order book,
wherein said order book includes a plurality of instrument bid orders priced in said specified currency, each with a different instrument bid price from at least one other instrument bid order of said plurality of instrument bid orders, and
wherein said order book includes a plurality of instrument ask orders priced in said specified currency, each with a different instrument ask price from at least one other instrument ask order of said plurality of instrument ask orders, and
wherein the method further comprises performing a trade in said instrument between said generated order in said order book and another order in said order book and performing a currency transaction to convert between said other currency and said specified currency when said generated order is matched by said another order, wherein said trade and said currency transaction are performed concurrently.

10. An automated trading system, comprising:
a computing device configured to implement an instrument trading module, an order receiving module, a currency exchange rate receiving module, a price calculating module, and a currency trading module,
wherein said instrument trading module is arranged to perform a trade in an instrument priced in a specified currency when, for a certain volume of said instrument, an instrument bid price matches an instrument ask price,
wherein said order receiving module is arranged to receive, from a trader, an order in said instrument priced in a currency other than said specified currency,
wherein said currency exchange rate receiving module is arranged to repeatedly and automatically receive, from an external source, an updated exchange rate between said other currency and said specified currency, wherein a last updated exchange rate received is a current exchange rate that is guaranteed at least until a next updated exchange rate is received,
wherein said price calculating module is arranged to calculate a price of said order in said specified currency based on said received order and said current exchange rate,
wherein said order generating module is arranged to generate said order priced in said instrument in said specified currency in an order book,
wherein said order book includes a plurality of instrument bid orders priced in said specified currency, each with a different instrument bid price from at least one other instrument bid order of said plurality of instrument bid orders,
wherein said order book includes a plurality of instrument ask orders priced in said specified currency, each with a different instrument ask price from at least one other instrument ask order of said plurality of instrument ask orders,
wherein said instrument trading module is arranged to perform a trade in said instrument between said generated order in said order book and another order in said order book when said generated order in said instrument priced in said specified currency is matched by said another order,
wherein said currency trading module is arranged to perform a currency transaction between said other currency and said specified currency when said generated order in said instrument priced in said specified currency is matched by said another order, and wherein said instrument trading module and said currency trading module concurrently perform said trade in said instrument and said currency transaction.

11. The automated trading system of claim 10, wherein when said updated exchange rate between said other currency and said specified currency is received subsequent to said generation of said order in said instrument priced in said specified currency, said order generating module adjusts said generated order to reflect said updated exchange rate received subsequent to said generation of said order.

12. The automated trading system of claim 11, wherein said order generating module is adapted to adjust said generated order each time said updated exchange rate between said other currency and said specified currency is received subsequent to said generation of said order or subsequent to said adjustment of said generated order to reflect said updated exchange rates received.

13. The automated trading system of claim 10,
wherein said external source is a market maker, and
wherein said market maker guarantees to perform a currency transaction based on said current exchange rate.

14. The automated trading system of claim 10,
wherein said external source is a currency market in which bids and offers in currencies are received, and
wherein said currency trading module is arranged to perform said currency transaction in said currency market between said other currency and said specified currency when, for a certain amount of said other currency, a currency bid price matches a currency ask price, wherein said received updated exchange rate is determined based on currency bids or offers in said specified currency.

15. The automated trading system of claim 10, wherein
said order received from said trader is an instrument bid order priced in said other currency, and
said current exchange rate between said other currency and said specified currency reflects a buying price for buying said specified currency.

16. The automated trading system of claim 10, wherein
said order received from said trader is an instrument ask order priced in said other currency, and
said current exchange rate between said other currency and said specified currency reflects a selling price for selling said specified currency.

17. The automated trading system of claim 10, wherein said other currency is selected from a group of available currencies.

18. In an automated trading system wherein orders in an instrument priced in a specified currency are received and a trade in said instrument is performed when, for a certain volume of said instrument, an instrument bid price matches an instrument ask price, and wherein orders in said specified currency are received and a trade in said specified currency is performed when, for a certain amount of said specified currency, a currency bid price matches a currency ask price, a method for automatically generating an order in said instrument priced in said specified currency, comprising:

said automated trading system receiving, from a trader, a first order in said instrument priced in another currency;
said automated trading system forming a combination order comprising a second order in said instrument priced in said specified currency and a third order in said specified currency priced in said other currency based on said first order;

said automated trading system performing, when said combination order is matched by an existing order in an order book, a trade in said instrument priced in said specified currency and a currency transaction between said specified currency and said another currency simultaneously; and said automated trading system generating, when said combination order is not matched by any existing order in said order book, a derived order in said instrument, in said specified currency, or both in said order book, wherein said derived order is formed so that when said derived order is matched by any existing order in said order book, said first and second orders of said combination order are automatically matched by existing orders in said order book, and trades in said instrument priced in said specified currency and said currency transaction between said specified currency and said another currency are performed simultaneously, wherein said order book includes a plurality of instrument bid orders priced in said specified currency, each with a different instrument bid price from at least one other instrument bid order of said plurality of instrument bid orders, and wherein said order book includes a plurality of instrument sell orders priced in said specified currency, each with a different instrument sell price from at least one other instrument sell order of said plurality of instrument sell orders.

19. The method of claim 18, wherein
said order book includes a plurality of currency bid orders between said other currency and said specified currency each with a different currency bid price from at least one other currency bid order of said plurality of currency bid orders, and
said order book includes a plurality of currency sell orders between said other currency and said specified currency each with a different currency sell price from at least one other currency sell order of said plurality of currency sell orders.

20. The method of claim 18, wherein
when said order from said trader is a bid order to buy a bid volume of said instrument at a first bid price per said instrument expressed in said other currency, said derived order includes one or both of
a derived instrument bid order to buy said bid volume of said instrument at a second bid price per instrument expressed in said specified currency, said second bid price being based on a best currency ask order, from a perspective of a buyer, in said order book between said other currency and said specified currency, and
a derived currency bid order to buy a volume of said specified currency sufficient to buy said bid volume of said instrument at a third bid price expressed as a ratio of said other currency and said specified currency, said third bid price being based on a best instrument ask order, from said perspective of said buyer, in said specified currency in said order book, and
when said order from said trader is an ask order to sell an ask volume of said instrument at a first ask price per said instrument expressed in said other currency, said derived order includes one or both of
a derived instrument ask order to sell said ask volume of said instrument at a second ask price per instrument expressed in said specified currency, said second ask price being based on a best currency bid order, from a perspective of a seller, in said order book between said other currency and said specified currency, and a derived currency ask order to sell a volume of said specified currency sufficient to sell said ask volume of said instrument at a third ask price expressed as a ratio of said other currency and said specified currency, said third ask price being based on a best instrument bid order, from said perspective of said seller, in said specified currency in said order book.

21. The method of claim 20, further comprising:
said automated trading system adjusting said derived order based on changes to said order book; and
said automated trading system performing, when said adjusted derived order is matched by any existing order in said order book, a trade in said instrument and said specified currency simultaneously.

22. In a client-based trader system connectable to a server-based trading system wherein orders in an instrument traded in a specified currency are received in said specified currency and in a currency other than said specified currency, an exchange rate between a currency other than said specified currency and said specified currency is received repeatedly, and when an order in said instrument priced in said other currency is received from a trader, a price of said order in said specified currency is calculated based on said received order and the last received exchange rate, said order in said instrument is generated in said specified currency, and when said order in said instrument generated in said specified currency is matched by another order, a trade in said instrument and a currency transaction are performed concurrently, a method for automatically trading in said instrument priced in said currency other than said specified currency, comprising:
said client-based trader system sending to said server-based trading system a buy or sell order in said instrument priced in said other currency;
said client-based trader system receiving information of said buy or sell order in said instrument priced in said specified currency from said server-based trading system, wherein a price of said buy or sell order in said instrument priced in said specified currency is based on a guaranteed exchange rate; and
when said buy or sell order in said instrument priced in said specified currency is matched on the market, said client-based trader system receiving information of a trade in said instrument and a currency transaction as performed concurrently by said server-based trading system,
wherein said buy or sell order in said instrument is generated in said server-based trading system in an order book,
wherein said order book includes a plurality of instrument bid orders priced in said specified currency, each with a different instrument bid price from at least one other instrument bid order of said plurality of instrument bid orders, and
wherein said order book includes a plurality of instrument ask orders priced in said specified currency, each with a different instrument ask price from at least one other instrument ask order of said plurality of instrument ask orders.

23. An automated trading system in which orders in an instrument priced in a specified currency are received and a trade in said instrument is performed when, for a certain volume of said instrument, an instrument bid price matches an instrument ask price, and wherein orders in said specified currency are received and a currency transaction between said specified currency and another currency is performed when, for a certain amount of said specified currency, a currency bid price matches a currency ask price, said system comprising:
a computing device configured to implement an order receiving module, a combination order generating module, an instrument trading module, and a derived order generating module,
wherein said order receiving module is arranged to receive, from a trader, a first order in said instrument priced in said another currency,
wherein said combination order generating module is arranged to generate a combination order comprising a second order in said instrument priced in said specified currency and a third order in said specified currency priced in said other currency based on said first order,
wherein said instrument trading module is arranged to perform a trade in said instrument priced in said specified currency and a currency transaction between said specified currency and said another currency simultaneously when said combination order is matched by an existing order an order book,
wherein said derived order generating module is arranged to generate, when said combination order is not matched by any existing order in said order book, a derived order in said instrument, in said specified currency, or both in an order book,
wherein said derived order is formed so that when said derived order is matched by any existing order in said order book, said first and second orders of said combination order are automatically matched by existing orders in said order book, and trades in said instrument priced in said specified currency and said currency transaction between said specified currency and said another currency are performed simultaneously,
wherein said order book includes a plurality of instrument bid orders priced in said specified currency, each with a different instrument bid price from at least one other instrument bid order of said plurality of instrument bid orders, and
wherein said order book includes a plurality of instrument sell orders priced in said specified currency, each with a different instrument sell price from at least one other instrument sell order of said plurality of instrument sell orders.

24. The automated trading system of claim 23, wherein
said order book includes a plurality of currency bid orders between said other currency and said specified currency each with a different currency bid price from at least one other currency bid order of said plurality of currency bid orders, and
said order book includes a plurality of currency sell orders between said other currency and said specified currency each with a different currency sell price from at least one other currency sell order of said plurality of currency sell orders.

25. The automated trading system of claim 23, wherein
when said order from said trader is a bid order to buy a bid volume of said instrument at a first bid price per said instrument expressed in said other currency, said derived order includes one or both of
a derived instrument bid order to buy said bid volume of said instrument at a second bid price per instrument expressed in said specified currency, said second bid price being based on a best currency ask order, from a perspective of a buyer, in said order book between said other currency and said specified currency, and
a derived currency bid order to buy a volume of said specified currency sufficient to buy said bid volume of said instrument at a third bid price expressed as a ratio of said other currency and said specified currency, said third bid price being based on a best instrument ask order, from said perspective of said buyer, in said specified currency in said order book, and when said order from said trader is an ask order to sell an ask volume of said instrument at a first ask price per said instrument expressed in said other currency, said derived order includes one or both of a derived instrument ask order to sell said ask volume of said instrument at a second ask price per instrument expressed in said specified currency, said second ask price being based on a best currency bid order, from a perspective of a seller, in said order book between said other currency and said specified currency, and a derived currency ask order to sell a volume of said specified currency sufficient to sell said ask volume of said instrument at a third ask price expressed as a ratio of said other currency and said specified currency, said third ask price being based on a best instrument bid order, from said perspective of said seller, in said specified currency in said order book.

26. The automated trading system of claim 25, wherein said derived order generating module is arranged to adjust said derived order based on changes to said order book; and said instrument trading module is arranged to perform, when said adjusted derived order is matched by any existing order in said order book, a trade in said instrument and said specified currency simultaneously.

* * * * *